Dec. 8, 1953        D. M. UMPHREY        2,662,134

HYDRAULIC CIRCUIT-BREAKER MECHANISM

Filed July 7, 1951        2 Sheets-Sheet 1

INVENTOR.
BY Donald M. Umphrey
Lippincott & Smith
ATTORNEYS

Patented Dec. 8, 1953

2,662,134

UNITED STATES PATENT OFFICE 2,662,134

HYDRAULIC CIRCUIT-BREAKER MECHANISM

Donald M. Umphrey, Palo Alto, Calif., assignor to Pacific Electric Manufacturing Corporation, a corporation of California Application July 7, 1951, Serial No. 235,587

10 Claims. (Cl. 200—82)

This invention relates to mechanisms for operating high-voltage high-power circuit breakers. It is related to and is an improvement on the inventions described in my prior applications Serial Nos. 156,409 and 156,410 now Patent No. 2,631,190.

The primary function of a circuit breaker is, as the name implies, to open an electric circuit in case of a fault in the transmission or distribution system of which it forms a part and thus prevent damage to the other equipment within the system. High power systems of the type for which the present invention is primarily adapted carry many thousands of amperes and the conductors which carry this current are necessarily massive. Voltages employed are also high; systems operating a nominal voltage of 230,000 are not uncommon and where such systems are opened under a fault the instantaneous voltage may rise one-half million. Hence to break the circuit certainly and cleanly large gaps must be opened which requires that the massive conductors mentioned must be moved for considerable distances. To minimize danger of damage when a fault occurs the gaps must be opened very rapidly in order to complete the break and extinguish the arc in a few cycles at most of the normal 60 cycle operating frequency, and the movement of such masses at such speeds requires that very large forces be involved and that, during the short period when these forces are in operation, energy be expended at a very high rate.

That a device be used for opening the circuit almost necessarily implies that it must also be able to close it. In the case of transient faults, such as are caused by an arc following a lightning stroke, it is frequently desirable that the circuit again be closed as soon as the arc is extinguished. In case the fault is of a transient nature it is also desirable that the reclosing be as rapid as possible in order that synchronous machinery connected to the section of the system on which the fault occurs and which has been cleared by a breaker may have a minimum opportunity to get out of step, since a reclosing with such machinery in the wrong phase may be nearly as disastrous as the fault itself. For this reason, and also to prevent arcing during closure of the breaker it is nearly as important that the closure occur with great rapidity as it is that the opening be rapid. Even larger forces are therefore necessary in closing the breaker than are employed in opening it, since, in closing, not only must the parts be accelerated but also the forces tending to open the breaker and keep it open must be overcome and energy stored for the next opening operation.

The possibility always exists that an attempt may be made to close a circuit breaker while a fault still exists on the line and this is particularly true when the breaker is of the automatic reclosing type. In order that the breaker give the protection which is its primary function it is therefore necessary that if an attempt be made to close it while the fault still continues this attempt shall be ineffective and that the breaker trip free of the closing mechanism and reopen in spite of the fact that a closure is being attempted.

In my prior applications above referred to I have pointed out the advantages of hydraulic operating mechanisms for circuit breakers of this character, as compared to mechanisms of either the purely mechanical or pneumatic type. Among the objects of this invention are to provide a mechanism which will take full advantage of the inherent features of hydraulic mechanisms as such and, more specifically, to provide a hydraulic operating mechanism which will trip free, when closed on a fault, irrespective of the operation of the main control or relay valve which governs the closing operation of the breaker; to provide a mechanism wherein no method of operation or sticking of any part can block the tripping action; to provide a mechanism wherein the hydraulic system can operate with extremely high speed; to provide a mechanism which will reset and prepare for a new closing operation immediately after tripping so as to prepare for practically instantaneous reclosure in case the fault has cleared; to provide a mechanism wherein the hydraulic system can be temporarily blocked so as to permit slow speed operation by hand in order that contacts may be adjusted or other service work be performed thereon but wherein such temporary blocking cannot accidentally be left to prevent the breaker from opening or closing after adjustments have been completed, and, in general, to provide a circuit breaker operating mechanism which combines a maximum of safety features with rapidity and certainty of operation and which is, therefore, as nearly as possible "foolproof."

The mechanism of this invention may be used to operate substantially any type of conventional breaker. Substantially all such devices employ some sort of operating rod or link to which the moving contacts of the breaker are connected and which is retracted by a powerful spring for opening the contacts. The operating mechanism is required to move this shaft longitudinally to make connection between the movable and the stationary contacts of the breaker proper and to store in the spring the energy necessary to open the contacts with the desired speed. Irrespective of the type of movement employed in the breaker proper it is easily possible to devise a linkage which will operate it by exerting a powerful pull on a connecting link. This is the type of action which the mechanism of the present invention is designed to perform, the construction of the breaker itself being immaterial.

Considered broadly the mechanism of the present invention comprises a piston operating within the hydraulic cylinder ported at one end to admit the operating liquid. The piston is linked to the operating rod and the opening spring tends to hold the piston at the ported end of the cylinder. A duct connects the cylinder with a hydraulic accumulator which is preferably kept constantly charged with a high pressure (say 3,000 pounds per square inch) by a small pump, preferably driven by an electric motor controlled by a pressure operated switch, so that, except immediately after the device has been operated to close the breaker, the pressure is maintained within narrow limits. A relay valve is located in the duct connecting the accumulator and the cylinder, this relay valve being operated hydraulically from the same accumulator which supplies the primary moving power through a small pilot valve which, when open, admits pressure to the relay valve opening it to admit the operating liquid into the cylinder, tensioning the linkage and closing the switch contacts. Latching means are provided for holding the breaker closed and a tripping coil for releasing the latch. The description as thus far given is equally descriptive of the mechanism described in my prior applications above mentioned. In my prior device, tripping, in case the breaker was closed upon a short, was accomplished by disabling the pilot valve and relieving the pressure operating the relay valve, permitting the latter to close the duct and open an escape passage for the liquid in the cylinder. In accordance with the present invention, however, tripping free is accomplished entirely independently of the action of the relay valve; a relief valve is provided from the duct between the relay valve and the cylinder. The relief valve is so constructed that it tends to open under the pressure of the operating liquid but is normally held positively closed against this pressure. Operation of the trip coil releases a latch which is connected by a common mechanical linkage to both the piston latch and the member which restrains the relief valve, permitting the latter to open and not only remove the pressure closing the breaker but also allow the liquid in the cylinder to escape freely. In case the trip coil is operated when the breaker is fully closed and the mechanical latch has engaged, the tripping of the device is purely mechanical; liquid could escape from the cylinder and the breaker could operate even in the absence of the relief valve. The simultaneous release of this latter device, however, opens a low-friction bypass or switch valve which further facilitates the escape of the operating liquid and allows the device to operate with maximum rapidity. In case the breaker is closing upon a pre-existing fault, however, and the mechanical latch holding it closed has not yet engaged, the opening of the relief valve immediately releases the operating pressure, permitting the escape of the oil in the same manner as if the breaker were operated from the mechanically latched position. Simultaneously with the opening of the relief valve, means are provided for closing the pilot valve, which also closes the relay valve and prevents waste of liquid stored in the accumulator. The mechanism of this invention therefore provides a number of safety features, each backing up the other.

Considered in inverse order, operation of the trip coil closes the pilot valve, immediately blocking the closing action; the relay valve automatically closes and opens an exhaust passage for liquid discharged from the main operating cylinder, and finally, but most important, the relief valve opens, releases the pressure which holds the switch valve in place, and the latter opens an immediate discharge passage for the liquid in the cylinder, thus permitting the discharge of the liquid even though both pilot valve and relay valve should stick. As additional precautions and safety factors, means are provided for preventing the operation of the closing mechanism when the breaker is already closed or when the tripping mechanism is functioning, and means are also provided for decelerating the mechanism at either end of its stroke so that both on opening and upon closing, the shocks of such operation are absorbed or minimized.

All of the above will be more readily understood by reference to the detailed description of a preferred form of the invention which follows, this description being considered in connection with the accompanying drawings wherein.

The nature of the invention can most readily be understood if the description which follows is subdivided into a number of sections. Of these the first to be described will be the main operating cylinder and the linkage connecting it with the circuit breaking mechanism proper; second, the hydraulic chain comprising the closing mechanism and including the accumulator, relay valve and pilot valve, plus certain auxiliary equipment; third the equipment for operating the pilot valve to close the breaker, and fourth the trip mechanism and its associated mechanical linkages. Describing the equipment in this order requires that in the course of the description certain of the functions will have to be temporarily taken for granted and reserved for later description.

The actual operating mechanism to which this specification is specifically directed is designed to be operated within a tank or sump 1 which is filled with oil, one of the silicene liquids, or other liquid or mixture of liquids which are particularly adapted for the operation of hydraulic mechanisms of various kinds. The operating liquid is taken from and discharged into this sump, which thus forms a reservoir storing an excess supply of liquid and assuring that in spite of evaporation or accidental spillage there shall be sufficient at all times for satisfactory functioning of the equipment. Secured to the top of the tank 1 is a heavy cover plate 3, held down by suitable bolts 5 and sealed to the sump by a gasket 7. The hydraulic portions of the device are comprised within a block 9 which is suspended from the cover 3. For convenience this block may be formed of a number of elements or sections bolted or otherwise secured together. This is simply for ease of manufacture, however, the block may be considered as a whole. The method of assembly, the screws, bolts, and so forth which hold the device together will therefore, in general, be omitted in order to simplify, as much as possible, the necessarily somewhat complex description.

The main operating cylinder 11 of the device is formed within the block, its axis being vertical. The cylinder is preferably provided with a liner 13, a ring seal 15 being provided to prevent leakage of the fluid around the liner. The piston 17 fits within the cylinder and is also sealed with ring seals. The piston is mounted on a piston rod 19; a slightly tapered boss 21 is mounted on the piston rod above the piston, between the upper surface of the latter and a shoulder on the piston rod. A piston rod extension 23 is substantially cylindrical immediately below the piston; below that again it is tapered and fluted to a progressively greater degree.

In the drawings the mechanism is shown in the circuit-closed position. When in this position the piston rod extension 23 projects through an aperture in a cylinder head 25, secured by bolts or other means not shown to the portion of the block 9 wherein the cylinder is formed. Resting on the cylinder head beneath the liner 13 is a retaining ring 27; this ring is provided with a number of inwardly projecting lugs 29 (only one of which is shown) which are adapted to engage a valve ring 31. The latter has an outer diameter which fits it loosely within the retaining ring 27 and an inner diameter which is just sufficient to clear the upper, cylindrical portion of the piston rod extension 23. This arrangement forms a check or shock absorber for decelerating the piston in the last stages of the closing operation of the breaker. When the breaker is in the open position a wide channel exists between the lower end of the piston rod extension and the inner periphery of the valve ring 31. As the piston is driven down in the closing operation the opening between the extension 23 and the valve ring becomes progressively smaller so that in the final stages of the closure only a very restricted opening is left through which the liquid from the lower or open end of the cylinder must be forced. Liquid friction is thus provided which gradually increases toward the end of the stroke and prevents the severe shock which would occur were the mechanism to be stopped suddenly. When the breaker trips, however, the ring 31 will lift and permit free ingress of liquid. A small check valve 39 in the piston permits the escape of dry air or other gas which might accumulate under the piston and defeat the hydraulic checking action.

The piston rod 19 extends upwardly from the piston through a port 33 which opens into a supply duct 35. Above this duct the piston rod passes through a piston rod bushing 37, also sealed to prevent the escape of liquid and thence out through and above a cover plate 3 to where it terminates in a bearing block 39.

The block carries a wrist pin 41 on which there is journalled a connecting rod or link 43. The latter, in turn, drives a restrained link or crank 45, turning on a shaft or pin 47 fixed between a pair of main frame members 49, which are more clearly shown in Fig. 3. Also pivoted to the rotating crank 45 is a floating link 51, driving, in turn, a bell crank 53 which is also pivoted to the main frame 49. The second arm of the bell crank is pivotally connected, at the pin 55, to the final driving rod or link 57 which moves horizontally to open or close the breaker. This link is shown as broken; it is continued schematically as the line 57'. The moving contacts, carried by a connecting bar 59, are also shown schematically as completing the circuit between the two portions of a transmission line 61, with a tension spring 63 tending to pull the contacts apart. As has already been explained this actual breaker mechanism may take various forms, unimportant to the present invention. It should be noted, however, that the spring 63 is very powerful, exercising a pull of several thousand pounds. The linkage connecting the piston rod and the spring is designed so that the mechanical advantage, as between the spring 63 and the piston, remains approximately constant at unity throughout the motion of the device.

From the description as given it follows that the spring tends at all times to open the contacts and in so doing pull the piston to the top of the cylinder. When the breaker trips and this occurs the boss 21 enters the port 23 near the end of the piston's travel and checks the motion of the piston in this direction in the same manner as the valve ring 31 does at the end of the closing stroke. It will thus be seen that admission of pressure into the duct 35 will drive the piston to the bottom of the cylinder, close the breaker, and hold it closed as long as the pressure is applied or the duct 35 is blocked, since the only escape for the liquid above the piston is through this duct. The next portion of this description therefore relates to the method of establishing the pressure in the duct and of relieving it when the breaker is to be opened. This is most clearly to be understood from Fig. 3.

Figures 3, 4:
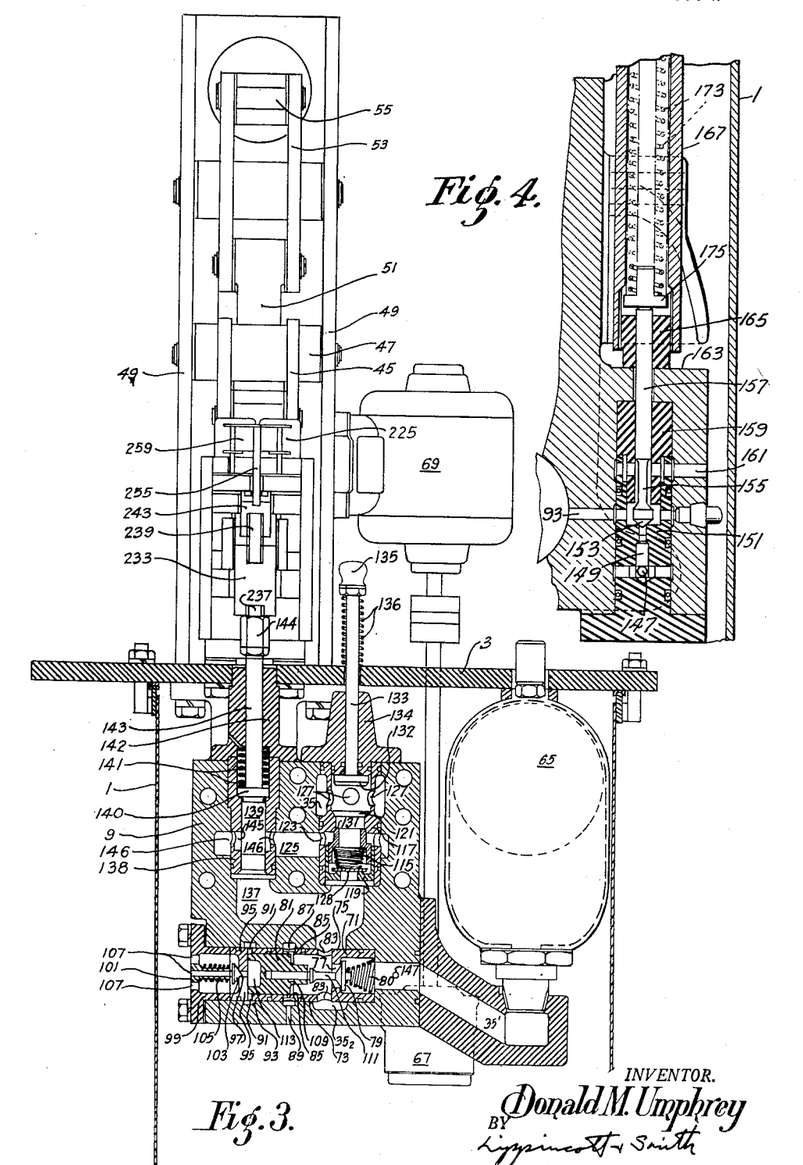
Fig. 3 is another sectional view of the device, the plane of section being indicated by the line 3—3 of Fig. 2.
Fig. 4 is a sectional view on a larger scale of the pilot valve illustrated in Fig. 1.

Mounted to one side of the block 9 within the sump 1 is a hydraulic accumulator 65. In their preferred forms, such accumulators comprise a bulbous forged casing of high tensile strength material within which is a bladder or balloon, preferably formed of highly impervious synthetic rubber such as "neoprene," filled under pressure with inert gas such as nitrogen. Other well known types of accumulators may, of course, be used. Liquid from the sump forced into the container 65 by a small, high pressure pump 67, driven by a motor 69, compresses the gas in the balloon to a small fraction of its original volume, the resulting gas pressure tending to force the liquid from the container for use in operating the mechanism. I prefer so to operate the device that the initial pressure of the gas, with no liquid in the container, is approximately 1,000 pounds per square inch. The motor 67 is controlled by a pressure operated switch of well known construction (not shown) so as to maintain the pressure within the container at approximately 3,000 pounds, under which circumstances two-thirds of the volume of the container is filled with liquid. This would be sufficient to operate the device approximately 15 times before the pressure fell below the satisfactory operating value, provided no liquid were wasted in the process. Actually, as will be shown, there is some liquid which is allowed to escape without doing useful work, but there remains a more than ample margin of safety for many immediately successive operations. It may be remarked here that the motor 69, specified in a commercial design upon which this specification is based, has ¼ horsepower output. During the brief interval of one breaker closing (approximately 0.2 second), energy is expended from the accumulator at the rate of approximately 250 horsepower. It is clear, therefore, that for repeated operations, as in the case of automatic reclosing, the accumulator is a necessary adjunct, since energy cannot be supplied at this rate by a motor or by any electrically driven pump which it would be practical to use. The pump must work for several minutes to restore the energy which has been expended in a fraction of a second.

The accumulator discharges into a portion $35_1$ of duct 35. This duct continues into the block 9 and in it is situated a relay valve, indicated by the general reference character 71.

The relay valve comprises a cylindrical housing 73, located in a horizontal bore within the lower portion of the block 9. It is divided into two parts by a transverse partition or septum 75 adjacent the end of the valve which faces the accumulator. The septum is provided with an axial port 77 within which there is formed a seat for a poppet valve 79. The head of the poppet valve faces the accumulator so that the accumulator pressure tends to hold it closed; a spring 80, acting in the same direction, serves the same purpose during manufacture and shipment, before pressure is applied. The system of the poppet valve extends through the port 77 into the other portion of the housing.

Beyond the septum 75, the internal diameter of the housing is enlarged to form a cylinder within which is fitted a freely floating piston valve 81. This cylinder portion of the housing is provided with three sets of ports. The first set, designated by the reference character 83, opens into a portion $35_2$ of the duct 35 which is formed in the block surrounding the valve housing 73. These ports 83 are formed immediately behind the septum. Beyond the ports 83, at approximately the middle of the cylinder portion of the housing, is a second set of ports 85 which open into a channel 87, also surrounding the housing and open into the sump through a passage 89. At the extreme end of the housing, a third set of ports 91 make a connection with a channel 93 which leads to the pilot valve.

The end of the housing cylinder is closed by a disc 95, sealed against liquid leakage and provided with a central port 97. The disc 95 is held in place by a hollow plug 99 which fits into the bore in the block and is bolted to the latter. Projecting inwardly within the hollow in the plug is a central column 101 which is bored to support the stem of a needle valve 103. A calibrated spring 105 forces the head of the needle valve against a seat formed in the port 97. Exhaust ports 107 open out of the hollow in the plug into the sump.

The main body of the piston 81 is of such length as partly to cover the ports 85 when the piston is at the extreme end of the housing. A central boss 109 projects from the end of the piston toward the septum 75, boss and piston being bored to receive and slide over the stem of the poppet valve 79. A shoulder 111 is formed on the poppet valve stem in such position that it will be engaged by the boss 109 after the piston has moved far enough toward the poppet valve completely to cover the ports 85. A central recess 113 is preferably formed on the end of the piston opposite the boss 109.

The action of this valve can now be explained. Liquid, under substantially the full pressure of the accumulator, is admitted from the pilot valve into the channel 93 and thence beneath the end of the piston. The pressure to which the other end of the piston is subjected is only that of the column of oil in the sump, since there is a direct connection to the latter through the passages 87 and 89. The piston weighs a few ounces at most; in the particular embodiment of the invention shown it has a diameter of an inch and one-half which is subject to the pressure from the accumulator through the pilot valve, and it therefore moves forward with great rapidity, first closing the ports 85 and then striking the shoulder 111 to raise the poppet valve 79 and permit liquid under the accumulator pressure to pass the valve and continue through ports 83 toward the cylinder 11. When this occurs, however, the pressure under the piston can only rise to a certain limited value before it acts against the head of the needle valve 103 to compress the calibrated spring 105, and the latter is adjusted so that the needle valve will open when this value reaches about 1,400 pounds per square inch. The end of the poppet valve 79 and that end of the piston facing the poppet valve are subjected to the full pressure of the liquid from the accumulator and of that passing the poppet valve respectively, and the piston therefore tends to move toward the left. This permits the poppet valve to close partially, throttling the flow of liquid past it and decreasing the pressure available against the piston head. This movement continues until the total forces on the two ends of the piston balance, which occurs when the pressure developed by the throttled liquid reaches a value of about 1,200 pounds per square inch, the normal operating pressure for which the actuating piston is designed. The mechanism therefore operates under substantially constant conditions and at substantially equal speed over approximately a 2 to 1 variation in accumulator pressure. This regulation is accomplished at the expense of some slight waste of accumulator liquid but this is unimportant.

The duct 35 continues on its way to the cylinder through a switch valve, generally designated by the reference character 115. The switch valve is mounted in a cylindrical housing 117 positioned in a vertical bore in the block 9 and provided with the usual seals to prevent liquid leakage. The lower end of the housing is bored to form a cylinder within which slides a floating piston 119. Above this portion of the housing it is constricted to form a conical valve seat, opening out above this again in another conical valve seat 121. The housing is provided with ports 123 immediately below the constriction, these ports opening into a passage 125 which discharges into the sump. A second set of ports 127 open into that portion of the duct 35 which leads directly to the main operating cylinder 11.

The sliding valve piston 119 is a composite structure comprising a cup-shaped body or lower portion which is centrally apertured and provided with internally projecting lips forming a seat for a check valve 128. This valve is normally retained in a closed position by a compression spring 115, bearing against an internal shoulder in an upper piston member 130. The latter fits within and is secured to the cup-shaped base; its upper end, projecting beyond the base, is tubular to permit passage of liquid through the piston and is of lesser diameter than the lower cup-shaped portion. Its upper end is provided with a frusto-conical face 131, forming a valve which engages the lower seat in the constricted portion of the housing when the piston is in its upper position, as shown in Fig. 3 of the drawing. The upwardly facing valve seat 121 is adapted to engage the face 132 of a manually operable plunger valve. This valve is mounted upon an elongated stem 133 passing upward through a bearing in a cap 134 which closes the upper end of the switch valve housing 117. The valve stem extends through the cover plate 3 and terminates in an operating knob 135. A compression spring 136, bearing against the cover plate 3 and the knob 135 normally holds this valve open.

The operation of this portion of the system is as follows: when the relay valve admits liquid into the portion 35$_2$ of the main operating duct, pressure is exerted against the bottom of the piston 119, raising it from its position at the bottom of the housing and engaging the valve surface 131 with its seat. Upon the entrance of more liquid into the duct the check valve 128 opens and liquid then flows up through the hollow piston valve and the ports 127 into the terminal portion of the duct 35 and the cylinder, thus operating the piston to close the breaker. When the closure is complete the breaker latches in the closed position and the pilot valve closes, as will be described hereinafter. Closure of the pilot valve releases the pressure behind the relay valve, closing the latter also and opening the relay valve exhaust ports 85. In the meantime cessation of flow into the cylinder through the check valve 128 has permitted the latter to close, but because of the opening of port 85 the switch valve piston can sink to the bottom of the housing, disengaging the valve surface 131 from its seat and opening a direct channel between the duct 35 through the passage 125 and into the sump. Under these conditions, if the breaker is tripped the liquid in the upper portion of the operating cylinder has a free path of escape and does not prevent or check operation of the breaker mechanism. Certain further functions of the switch valve will be explained hereinafter.

The valve 132 has only an auxiliary function. The normal mechanism for operating the breaker works extremely rapidly and offers no means for retaining the mechanism in partially operated condition, as is necessary, upon occasion, in replacing or adjusting breaker contacts. When this is to be done the manual operating handle or knob 135 may be depressed, blocking off the escape of liquid from the operating cylinder. Liquid then may be injected by means of a manually or motor operated pump (not shown) into the duct 35 above the valve 132, operating the main cylinder and its operating linkage, as slowly as may be desired, to any position required for the process. While this is being done the pressure within the cylinder and duct holds the valve 132 closed, this pressure deriving, of course, from the force exerted by the spring 63 through its linkage upon the piston. Adjustments of the type mentioned are, of course, always made with the contacts all dead, and the feed side of the breaker is never energized with the breaker closed. If, however, it should be fully closed by hand until the latch engages, there will be some inevitable leakage in the system, and the operating liquid being practically incompressible only a minute amount of such leakage is required to relieve the hydraulic pressure. The spring 136 therefore causes the valve 132 to start to open and as soon as this occurs the pressure above the valve is relieved and the spring 145 takes full charge and opens the valve completely. Normally, however, this would never occur; the usual procedure would be first to close the breaker fully by operating the mechanism through the pilot valve in the usual fashion, and the admission of any pressure whatsoever through the switch valve below the valve 132 opens the latter instantly and clears the temporary block in the duct.

Opening out of the duct 35, between the relay valve and the switch valve, is a branch duct 137 connecting with a vertical bore in the block 9 wherein there is located a cylindrical housing 138 of a relief valve. The function of this latter valve is to open if a fault occurs during the operation of closing the breaker, relieve all pressure against the main piston and permit the spring 63 to open the contacts. The relief valve takes the form of a piston 139 which slides vertically within the housing. Downward movement of the piston is limited by a shoulder 140 on its upper end, which moves in an enlarged portion of the housing bore and is stopped by the constriction which fits the piston itself. A compression spring 141 bears against the shoulder 140 and also against a cap 142 which acts as a closure for the bore in the block 9 and holds the assembly in place. The spring 141 surrounds a valve stem 143, rising from the shoulder 140 and passing upward through a sliding bearing in the cap 142. The valve stem terminates in a head 144, threaded on the stem 143 so that the effective length of the stem may be accurately adjusted. Except during the tripping operation, mechanical means, later to be described, bears against this head and holds the piston 139 in its lower position as shown in the figure, irrespective of pressure in the duct 137 which would tend to force it upward.

An annular channel 145, formed in the housing 138 opens through ports 146 into the passage 125. The channel 145 is so positioned that when the relief valve is in its lowermost position it extends slightly past the lower edge of the channel and closes the passage through it from the branch duct 137 and ports 146 into passage 125. The parts are so proportioned that an upward movement of approximately $\frac{1}{16}$ of an inch will open the valve thus formed.

In the particular design here described, the diameter of the piston 139 is 1 inch. Under the operating pressure of 1,200 pounds per square inch for which this mechanism is designed, this means that the force exerted against the end of the relief valve piston is approximately 1,000 pounds. A piston valve of this type is not sufficiently tight to prevent all escapage of liquid under pressures such as this, but the amount escaping during the extremely short periods required in closing the mechanism is unimportant.

The thrust exerted by the spring 141 is not at all the same magnitude as the thrust on the piston when the mechanism is operating. The function of the spring is merely to close the valve when the pressure in the ducts is relieved, and to do this rapidly so as to permit immediate reoperation of the device. The spring must, therefore, have sufficient strength to accelerate the mass of the piston and reclose the valve in a small fraction of a second, but since the total motion required for this is small, the force on the spring may be of the order of tens of pounds rather than hundreds.

The additional functions of the switch valve, mentioned above, may now be considered. Since the relief valve can open when the breaker is tripped, either when fully closed or during a closing operation, the oil in the operating cylinder would have an escape into the sump even if the switch valve were replaced by an open duct, and the switch valve might therefore appear an unnecessary complication. On the contrary, however, it contributes functions which make it a highly important part of the mechanism. First, it permits the relief valve to close as soon as the direct pressure from the accumulator is cut off. It is thus possible to start reclosing the breaker as soon as or even before it is fully open. Second, in case the relay valve should become stuck during a trip-free operation, the relief valve need carry only the fluid from the accumulator so that flow from the operating cylinder is not slowed by having to go through the same restricted passage. Third, it permits the circuit breaker to open rapidly should the flow of oil from the cylinder be interrupted for any reason during a closing operation. Should this occur, the inertia of the switch mechanism itself wil lkeep it momentarily in motion, producing a negative pressure as compared to the oil in the sump. The check valve being open at the instant of cutoff, the pressure below the valve will be the same as in the cylinder, and pressure from the sump on the piston shoulder will cause the valve piston 119 to start to fall. As soon as this happens, the oil has a direct passage from the cylinder into the sump, and when the inertia of the moving parts is checked by the opening spring, the breaker immediately opens fully. This avoids the hazards of the breaker locking in a partly closed position. Fourth, it permits the use of the manual valve 132, as already described.

Considering next the pilot valve, it is fed with the full pressure from the accumulator through a channel 147 formed in the block 9. The intake end of this channel is shown in Fig. 3, and its outlet end in the lower right hand corner of Fig. 1. This channel connects with a central bore 149 in a lower pilot valve housing 151, the upper end of this bore serving to seat the conical needle valve face 153 which serves as the pilot valve proper. Above the valve seat, the lower portion of the pilot valve housing is provided with ports opening into the connection 93 leading to the relay valve. The needle valve has an enlarged head, connecting by a reduced neck portion 155 with a valve stem 157 through which the pilot valve is operated. The upper side of the head 153 of the needle valve is also conical in form to form a relief valve which seats in the end of a bore in an upper pilot valve housing 159 wherein the guide for the valve stem 157 is formed. The passage formed between the reduced neck 155 of the valve stem and the bore in which it operates connects through ports in the housings to a passage 161 leading into the sump.

Figures 1, 2:
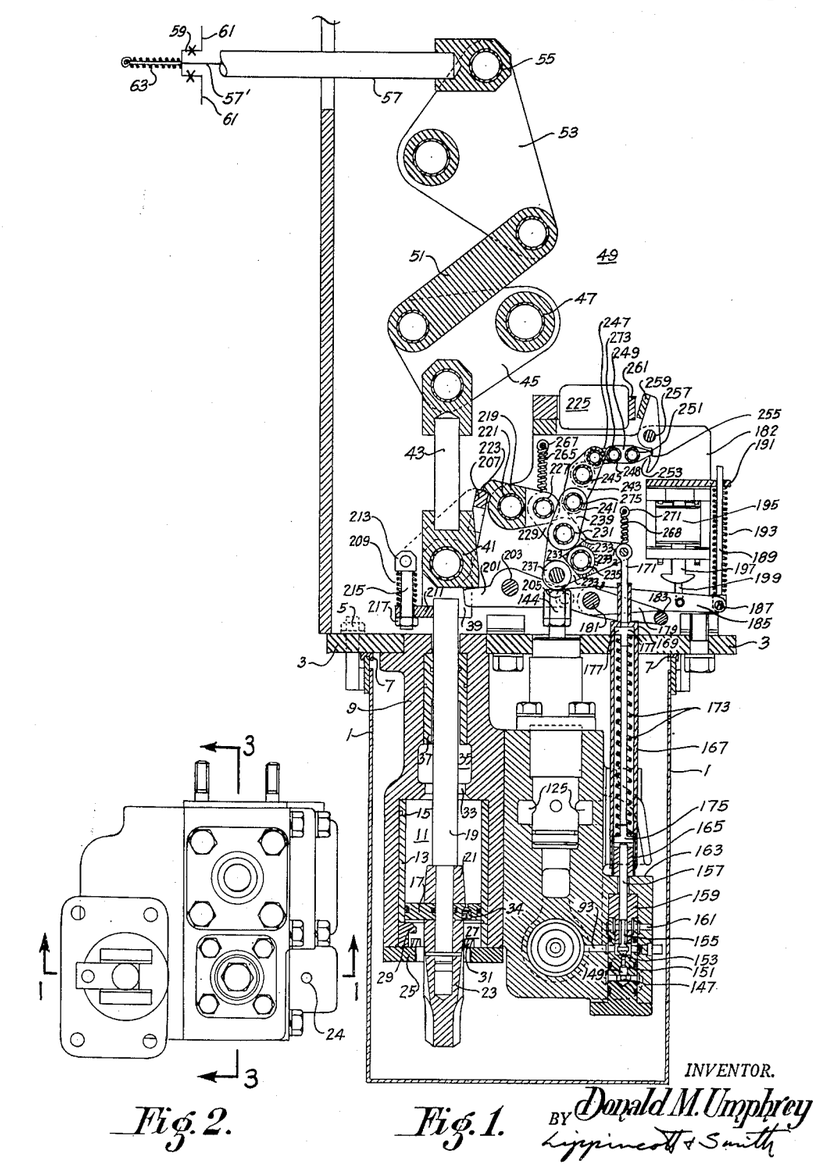
Fig. 1 is a vertical sectional view of a preferred form of the device, the plane of section being indicated by the line 1—1 of Fig. 2. In this figure, the hydraulic mechanism per se and the linkage connecting it to the operating shaft of the breaker are shown; the breaker mechanism itself is, however, merely schematically indicated.
Fig. 2 is a plan view of the hydraulic mechanism per se.

The stem 157 extends upwardly and out through a step 163 in the block 9 into the sump. Beyond the step it projects about ⅛ of an inch past a cylindrical bushing 165 secured in the end of a vertically slidable tubular casing 167 which extends slightly above the cover 3. Beyond this point its diameters, internal and external, are sharply reduced at a shoulder 169. The smaller diameter portion continues upward for sufficient distance to form a loosely fitting guide for a plunger 171, which, in the position shown, terminates a slightly greater distance (about 1/16 of an inch) above the internal shoulder than the projection of the valve stem 157 above the bushing 165. This difference corresponds to the movement of the valve between its closed position (open to the sump) and its open position, with the passage to the sump closed.

Within the casing 167 is shock-absorber means for limiting the forces applied to the pilot valve, which otherwise might rise to extremely large values and cause damage and eventual destruction to the valve and its seat. Such means comprise a stressed compressing spring 173, held between bearing blocks 175 at the lower end of the casing and 177 at the upper end. Bearing block 175 rests either on the end of the valve stem 157, as shown in the drawing, or, when the casing slides upward, on the end of the bushing 165. Bearing block 177 bears either against the interior of the shoulder 169 or against the end of the plunger 171, as the case may be. The spring 173 is compressed at all times with a force sufficient to hold the pilot valve closed against the maximum pressure from the accumulator and is so designed and of sufficient length that ⅛ of an inch expansion, which permits it to bear against the bushing 165, has a negligible effect upon the compressive force upon it. Thus in the particular design shown, the length of this spring, when in place and compressed, is 7 inches. If its unstressed length is 14 inches, the ⅛ of an inch difference between its two positions will make less than 2% difference in the force exerted by it and this is small in comparison with the safety factor which must be provided to insure that it will hold the pilot valve closed under possible excess pressure from the accumulator.

The casing is normally held down in the position shown in the drawing by a lever 179 which bears against the shoulder 169 and is pivotally mounted upon a pin or fixed shaft 181 secured to a frame member 182. A transverse pin 183 is welded or otherwise secured to the end of the lever 179 at approximately twice the distance from its fulcrum 181 to the bearing point of the lever against the shoulder 169. The pin 183 is engaged by a second lever, 185, which is also journalled on the stationary shaft 181. The latter lever extends out past the transverse pin 183 and terminates in a pivotal connection 187 with a guide rod 189 extending vertically upward, its upper end sliding freely through an opening in a bracket 191 secured to the frame 182. A compression spring 193, bearing against the bracket 191, forces the lever 185 down against the pin 183 and thus holds the casing 167 in its lower position and the pilot valve 153 closed, spring 193 being designed and stressed so that with its mechanical advantage it can compress spring 173.

Opening of the valve is accomplished electrically by means of a solenoid 195, also mounted on the bracket 191. The core or plunger 197 of the solenoid connects through a link 199 with the lever 185. Closing of the breaker is accomplished by exciting the solenoid, raising the plunger 197 and the lever 185 and compressing the spring 193. This permits the lever 179 to rise, the casing 167 following it until the bearing block 177 hits the end of the plunger 171. Before this occurs the spring 173 will have expanded sufficiently so that the bearing block 175 will rest against the bushing 165, and permit the valve stem to follow the casing in its upward movement. Pressure from the accumulator immediately opens the needle valve 153 and simultaneously closes the passage around the valve stem 155 and into the sump. The hydraulic system then operates to close its breaker as has already been described.

As soon as the closure of the breaker is complete, and the piston 17 has reached the limit of its travel to the bottom of the cylinder, the end of the connecting rod 43 engages the projecting end of a lever 201 turning on a fulcrum 203 fixed to the frame member 182. This forces the other end of the lever upward; the upward moving end of the lever 201 terminates in a fork bearing 205, which engages a pin carried by an extension of the lever 179 projecting beyond the fulcrum. This forces the end of the lever 179, which has already been described, down against the shoulder 169 and closes the pilot valve and holds it closed positively, even though the solenoid 195 may still be actuated and irrespective of any later actuation of the solenoid before the breaker has tripped.

Concurrently with this last described action a latch engages which holds the breaker closed. This latch comprises a pawl member 207 pivoted on the wrist pin 41. The pawl member is urged in a clockwise direction by a compression spring 209. The spring 209 bears against a lug 211, welded or otherwise secured to the end of the piston rod 19, and the head 213 of a limit bolt 215 which passes through the spring and carries an adjusting nut 217 below the lug 211. The head 213 is pivoted, bell crank fashion, to the pawl 207, urging it in clockwise direction but limiting its motion to the position shown in the drawing while permitting it to be rotated slightly in the opposite direction in order to snap past its latch.

The end of the pawl 207 is engaged by a latch formed on the end of a lever 219 pivotally mounted on a shaft 221 which is fixed in the frame 182. It will be noted that when in the engaged position shown, the mating faces of the latch and of the pawl lie in a surface 223 which is perpendicular to the radius joining the axis of the pawl with the center of the engaging faces. The reaction from the pressure of the opening spring 63 therefore exerts no moment which would tend to rotate the pawl counterclockwise and release it. In fact, any moment which does exist is due to the lever arm represented by the perpendicular distance from the engaging faces 223 to the axis of the piston, which would tend to cause a clockwise rotation, further engaging the surfaces. When the latch lever 219 starts to rotate clockwise, however, and the face of the latch starts to slope, a counterclockwise moment with respect to the pawl comes into existence, tending to compress the spring 209 and permit the pawl to slip past the latch. There is therefore no tendency for the latch to bind.

The latch 219 is held in position by a linkage which is normally retained in the locking position shown by a tripping latch mechanism releasable by a tripping magnet 225. The principles of the linkage used have been described at length in my copending application Serial No. 156,410, now Patent No. 2,631,190, above referred to. The linkage is such that when the tripping latch is engaged it possesses a very large mechanical advantage over the main latching mechanism which holds the breaker closed, but, through a cascaded group of toggle arms, loses this mechanical advantage very rapidly as release starts, so that the effective inertia offered by the system diminishes with great rapidity. The rightwardly projecting end of the lever 219 is pivotally connected by a journal pin 227 to a link 229, the other end of which is journalled on a pin 231 to one arm 233₁ of a three-arm crank 233. This crank turns upon a shaft 235 fixed to the support frame 182. The other two arms, 233₂ and 233₃ are journalled, respectively, to the upper end of the plunger 171 and to a roller 237, respectively. The functions of these will be described later. For the present it should be noted that when the latch is in the engaged position the crank wheel bears shaft 235, and the link pins 231 and 227 are nearly, but not quite in a straight line, so that the force against the link 229 and the crank arm 233₁, tending to rotate the crank 233 clockwise acts against a very small lever arm. The reactive moment exerted against the latch lever 219, however, acts through a large lever arm.

Also journalled on the pin 231 is a link 239 connecting through a pin 241 with a lever 243 turning on a fixed shaft 245. In the latched position this last linkage is also nearly but not quite straight, so that the upward thrust caused by the tendency of the linkage 229—233₁ to buckle tends to turn the lever 243 in a clockwise direction but again through a very small lever arm.

The lever 243, extending beyond its fixed shaft 245, is pivotally connected to a much smaller link, 247, connecting, in the same manner as before, to final latch link 249 pivoted on a fixed shaft 251. The projecting end of the lever 249 is formed with a latch face 253 which engages with a hook or latch 265 pivoted on a fixed shaft 257. An upwardly projecting end of lever 255 carries an armature 259 which is attracted to the core 261 of the trip coil 225 when the latter is excited. As in the portions of the linkage previously mentioned the links 247 and lever 249 are nearly alined, so that the lever arm through which a moment is exerted tending to rotate lever 249 clockwise is small when the device is in the latched position while the arm through which the link 247 operates on the lever 243 is relatively large.

When the latch 255 releases, due to the action of the tripping coil, each of the nearly straight linkages through which the force from the main latch is transmitted must buckle before the next preceding element in the linkage chain can operate. Such buckling not only increases the lever arm through which the later elements of the linkage are driven, thus decreasing the mechanical advantage of these latest elements but it also straightens out the driving linkage, which again reduces the mechanical advantage of the later elements. With the relative dimensions of the parts as shown in the drawings the mechanical advantage of the trip latch over the main latch is in the neighborhood of 1,250 to 1. If the tension on the spring 63 is such as to produce a force of 4,000 pounds at the interface between the pawl 207 and latch lever 219, the resulting force on the trip latch is therefore only a little over 3 pounds and the sliding resistance at the face 253 is much less than this so that there is no tendency for the latch to stick. Once movement of the linkage starts there is a very rapid transfer of the mechanical advantage, and by the time the pawl 207 has cleared the latch 219 the advantage has reversed to nearly the same ratio in favor of the lever 219. It is therefore only at the very first instant of the release that the inertia of the lever 219 has any material effect on the system.

The relief valve 139 is also held closed by the linkage that has just been described, the roller 237 bearing against the head 144 of the relief valve stem. During the period when the breaker is closing it has been shown that there is a force of approximately 1,000 pounds on the relief valve. This force tends to rotate the crank 233 clockwise; i. e., in the same direction as the moment exercised by the main latch when the latter is engaged. The parts are so designed that the moment on the crank 233 resulting from the relief valve thrust is substantially the same as that exerted by the latch mechanism. This is accomplished by making the effective layer arm through which the relief valve thrust operates four times that through which the moment of the latch operates. The restraining force on the lever 249 is therefore substantially the same in both cases, but since, as has been shown, the pilot valve is positively closed mechanically as soon as the main latch is engaged the two moments are not operative simultaneously. Therefore, if the breaker trips during the closing operation the linkage between the crank 233 and the tripping latch operates in the same general manner as has already been described; the crank 233 rotates clockwise and the relief valve opens to release the pressure on the piston and permit the breaker to open just as rapidly as would be the case had the mechanical latch tripped.

When this occurs the crank arm $233_2$ drives the plunger 171 downward against the bearing block 177, compressing the spring 173 and closing the pilot valve irrespective of the fact that the solenoid 195 is excited and the housing 167 is free to rise so far as the normal closing mechanism is concerned. The downward thrust on the plunger occurs with nearly the full force of the thrust on the relief valve—somewhere in the neighborhood of 750 pounds, taking into account the difference in the effective lever arms $233_2$ and $233_3$, and therefore it is in this operation that the shock absorbing action of the spring 173 is particularly necessary.

As should be clear from the description of the hydraulic system, as soon as the relief valve has opened and the pilot valve closed the switch valve opens a free passage from the duct 35 into the sump and therefore the relief valve may again close immediately under the impetus of its spring 141. The relays operating the tripping coil 225 and the closing solenoid 195 are interconnected, as is the most usual practice, so that the solenoid cannot continue to be excited after the trip has occurred. The spring 193 therefore causes the lever 179 to follow the casing down and continue to hold the pilot valve closed irrespective of the action of the plunger 171 and hence the release linkage can immediately be reset, even before the opening action of the breaker is fully complete, in order to prepare for another automatic or manual reclosing.

Resetting is accomplished by one or more relatively small springs acting upon the linkage mechanism. In the present case this is effected by a tension spring 265 connecting between a pin 267, fixed to the frame member 182, and shaft 227, so as to tend to rotate lever 219 counter-clockwise into position for re-engagement with the pawl 207. A similar spring 269 connects from pin 271 to lever arm $233_2$, also tending to urge crank 233 counter-clockwise. These springs need have only a few pounds pull since the inertia of the linkage as a whole is relatively small and since these springs have a high mechanical advantage when the linkage is in the tripped condition.

It is also desirable to provide means for insuring that the connecting links do not buckle in the wrong direction. This can be accomplished by torsion springs, such as those indicated at 273 and 275 respectively, coiled around pins 248 and 241. The turning moments exerted by these springs are in opposition to those of springs 265 and 269, but are much smaller, so that they do not interfere with the function of the last-mentioned springs. The trip latch therefore returns to position for re-engagement as soon as the relief valve closes or the pawl 207 clears the latch 219, as the case may be.

The various features which have been described cooperate to insure not only that the circuit breaker will operate in its intended fashion when called upon to do so, either in the opening or closing phases, but also that if any part should fail or stick it will "fail safe" and permit the breaker to open under any and all conditions. As soon as the breaker is closed the pilot valve is held shut positively by mechanical means and the liquid within the main operating cylinder 11 has free egress into the sump, not only through the switch valve but also through the relay valve. When the trip operates with the breaker in fully closed condition the force on the piston from the opening spring is sufficient to open the relief valve even though the switch valve might have stuck, again permitting free egress of the liquid, which is thus offered a double passage into the sump. These passages are wide and the inertia of the liquid is small; negligible, in fact, in comparison with the inertia of the switch mechanism as a whole. All passages which carry pressure during the closing phase of operation are open to the sump as soon as the breaker trips, this offering a safety factor which "backs up" the other safety measures which have been described. The hydraulic operation gives automatic shock absorption at the end of the opening and closing operations and thus conduces to long operating life.

The specific details of the design here described can be modified in many ways without materially affecting the operation of the mechanism as a whole, and the individual safety features are effective even though not backed up by some of the others mentioned.

The following claims define the mechanism hereinabove described.

What is claimed is:

1. Mechanism for operating circuit breakers or the like comprising an operating piston and a cylinder for said piston, a hydraulic accumulator, a duct connecting said accumulator and cylinder and a normally closed relay valve in said duct; a normally closed pilot valve connected to said accumulator and operative to admit pressure therefrom to open said relay valve, a relief valve opening from said duct between said relay valve and said cylinder, a trip coil, and a mechanical linkage including a latch for retaining said piston in operated position and means for holding said relief valve closed and operative to release both said latch and said holding means on operation of said trip coil.

2. Mechanism in accordance with claim 1 including means for opening said pilot valve and means for disabling said opening means on actuation of said trip coil.

3. Mechanism in accordance with claim 1 including a switch valve in said duct between said relief valve and said cylinder and operative on application of pressure in said duct to direct liquid therein into said cylinder and on relief of said pressure to open a passage from said cylinder out of said duct.

4. Mechanism in accordance with claim 3 wherein said switch valve comprises a hollow piston slidably mounted within said duct and adapted to be advanced therein by pressure from said accumulator and close an exhaust port in the wall of said duct when in advanced position, and a resiliently restrained check-valve within said piston and forming a closure for the end thereof, said check-valve being positioned to open to permit flow from said accumulator to said cylinder.

5. Mechanism in accordance with claim 1 including a pressure regulating valve interposed between said accumulator and said cylinder for limiting the pressure of fluid reaching said cylinder.

6. Mechanism in accordance with claim 1 wherein said relay valve comprises a housing having a bore therein and a ported partition extending across said bore, a poppet valve seating in said port and so directed that pressure from said accumulator tends to close said poppet valve, said housing being ported into said duct beyond said poppet valve; an exhaust passage opening into said housing beyond the port into said duct, a floating piston slidable within said bore and dimensioned to expose the opening into said exhaust passage when at the end of said bore opposite said poppet valve and first to close said opening and then engage and lift said poppet valve on motion toward the same, the connection from said pilot valve opening into said bore behind said piston.

7. Mechanism in accordance with claim 6 wherein said bore is provided with a port behind said piston, and including a needle relief valve closing said port and a calibrated spring tending to hold said needle valve closed, thereby limiting the pressure applied to said piston from said accumulator and permitting said piston to retract and partially close said poppet valve when the pressure in said duct exceeds a predetermined value.

8. Mechanism in accordance with claim 1 wherein said pilot valve comprises a needle valve in the connection between said accumulator and said relay valve, a stem on said needle valve, a compression spring of sufficient strength to hold said needle valve closed and a casing surrounding said spring, said spring bearing on said stem and the end of said casing and said casing being slidably mounted with respect to said mechanism as a whole in a direction axial of said stem, means for locking said casing in advance position to hold said needle valve closed, means for releasing said locking means to permit said casing to retract and said needle valve to open, and a plunger passing through the end of said casing normally bearing against said spring and itself engageable with the end of said spring, said plunger forming a part of said mechanical linkage and operative to compress said spring and close said needle valve upon operation of said trip mechanism irrespective of the position of said casing.

9. In combination with a switch operating mechanism comprising a source of fluid pressure, an operating cylinder and piston, a duct connecting said cylinder and said source and a control valve in said duct for admitting pressure from said source to or cutting it off from said cylinder; a relief valve opening out of said duct between said control valve and said cylinder, tripping mechanism operative to permit said relief valve to open and thereby relieve pressure in said duct and prevent operation of said piston, and a switch valve in said duct between said relief valve and said cylinder and operative under a pressure gradient causing a flow from said source toward said cylinder to open a passage therethrough into said cylinder from said duct and under a pressure gradient in the opposite direction to close said passage and open an exhaust passage out of said cylinder, whereby fluid can continue to escape from said cylinder irrespective of whether or not said relief valve, said control valve or both are or remain open or closed.

10. The combination as recited in claim 9 wherein said duct is provided with an exhaust passage opening laterally therefrom and said switch valve comprises a piston having a longitudinal passage therethrough, said piston being slidably mounted within said duct and positioned therein so as to cover said exhaust passage in the limit of its motion toward said cylinder and form a passage through its hollow interior continuous with said duct and to uncover said passage when moved in the opposite direction, a check valve within said piston opening to permit flow of fluid therethrough toward said cylinder, and resilient means for holding said check valve closed against pressures insufficient to cause said piston to slide to said limit of motion and cover said exhaust passage.

DONALD M. UMPHREY.

No references cited.